US 9,258,758 B2

(12) United States Patent
Miranda et al.

(10) Patent No.: US 9,258,758 B2
(45) Date of Patent: Feb. 9, 2016

(54) METHOD AND APPARATUS FOR PROVIDING LONG DISTANCE SERVICE FOR ROAMING MOBILE TELEPHONES

(75) Inventors: Carlos Miranda, Deerfield Beach, FL (US); Duc Minh Vo, Montreal (CA)

(73) Assignees: Tata Communications (America) Inc., Herndon, VA (US); Tata Communications (Canada) Ltd. (CA)

( * ) Notice: Subject to any disclaimer, the term of this patent is extended or adjusted under 35 U.S.C. 154(b) by 303 days.

(21) Appl. No.: 13/468,145

(22) Filed: May 10, 2012

(65) Prior Publication Data

US 2013/0303161 A1 Nov. 14, 2013

(51) Int. Cl.
*H04W 40/00* (2009.01)
*H04W 4/00* (2009.01)
*H04M 3/00* (2006.01)

(52) U.S. Cl.
CPC ............... *H04W 40/00* (2013.01); *H04M 3/00* (2013.01)

(58) Field of Classification Search
CPC ....... H04M 7/12; H04M 3/42; H04M 7/1245; H04M 7/1255; H04M 3/00; H04W 8/26; H04W 4/24; H04W 8/06; H04W 8/18; H04W 12/06; H04W 12/08; H04W 8/12; H04W 40/00; H04W 4/02; H04W 4/16; H04W 76/021; H04W 8/04; H04W 8/20
USPC ........ 455/413, 432.3, 445, 422.1, 558, 414.1, 455/456.1, 461, 126, 435.1, 432.2, 406, 455/433, 432.1; 370/259, 310, 352; 379/207.02, 114.29, 121.01, 221.03
See application file for complete search history.

(56) References Cited

U.S. PATENT DOCUMENTS

| | | | | |
|---|---|---|---|---|
| 2002/0061100 A1* | 5/2002 | DiCamillo | .......... | H04M 3/4228 379/221.02 |
| 2005/0130649 A1* | 6/2005 | Kirby | .......................... | 455/432.1 |
| 2006/0089140 A1* | 4/2006 | Zhang | ......................... | 455/432.1 |
| 2008/0261603 A1* | 10/2008 | Sever et al. | ..................... | 455/445 |
| 2009/0253420 A1* | 10/2009 | Stewart et al. | ................. | 455/417 |
| 2011/0235792 A1* | 9/2011 | Foster et al. | ................ | 379/114.2 |
| 2012/0020253 A1* | 1/2012 | Brahmbhatt | ................... | 370/259 |
| 2012/0250677 A1* | 10/2012 | Beason et al. | ................. | 370/352 |
| 2013/0188785 A1* | 7/2013 | Zhakov | ....................... | 379/90.01 |
| 2013/0230153 A1* | 9/2013 | Sennett et al. | ................... | 379/46 |

* cited by examiner

*Primary Examiner* — Inder Mehra
(74) *Attorney, Agent, or Firm* — Kaplan Breyer Schwarz & Ottesen, LLP

(57) ABSTRACT

When a roaming telephone user in a visited network dials a long-distance number, he is transferred to a substitute telephone number which is local to that network and belongs to a service center which can route his call efficiently and cost effectively. Typically, the visited network contacts the user's home network for permission to complete the long-distance call. When that happens, the home network obtains the substitute number from a database on a telephone number server, based upon the location of the visited network, and responds to the visited network, instructing it to forward the user's call to the substitute telephone number. When the service center receives the roaming user's telephone call, it contacts the telephone number server and obtains the original long-distance number, which is stored in the database in association with the substitute telephone number. The service center is then able to route the roaming users call efficiently and cost-effectively by making use of its base of service providers.

31 Claims, 6 Drawing Sheets

METHOD AND APPARATUS FOR PROVIDING LONG DISTANCE SERVICE FOR ROAMING MOBILE TELEPHONES

BACKGROUND OF THE INVENTION

The present disclosure relates to mobile telephone communications and, more particularly, concerns a method and apparatus for providing efficient, cost-effective long-distance telephone connections for a roaming mobile telephone.

Mobile telephone users typically pay a premium for roaming service. Should a roaming mobile telephone user place a long distance call, he will not only pay a steep additional premium, but the choice of routing for completing his call is entirely in the control of the visited. The connection charges are not only likely to be very high, but it is unlikely that the visited network would take optimum advantage of cost efficient routing. There is therefore a need to enable a roaming mobile telephone user to obtain efficient, cost-effective long-distance connections that are not under control of the visited mobile network.

SUMMARY

In accordance with one aspect of embodiments of the present disclosure, when a roaming telephone user in a visited network dials a long-distance number, he may be transferred to a substitute telephone number which may be local (as opposed to a long distance number) to that visited network and is associated with a service center which can route his call efficiently and cost effectively. Typically, the visited network contacts the user's home network for permission to complete the long-distance call. When that happens, the home network obtains the substitute number from a database that is based upon the location of the visited network, where the database is associated with a telephone number server. The home network responds to the visited network, instructing the visited network to forward the user's call to the substitute telephone number. When the service center receives the roaming user's telephone call, it contacts the telephone number server and obtains the original long-distance number, which is stored in the database in association with the substitute telephone number. The service center is then able to route the roaming users call efficiently and cost-effectively to the original long-distance number by making use of the service center's base of service providers.

In accordance with another aspect of embodiments of the present disclosure, the service center maintains communication with the telephone number server and/or the home network while the user's telephone call is being connected and for the duration of the user's telephone call. The service center can provide continuous or frequent updates concerning the status of the user's telephone call to the telephone number server and/or the home network.

BRIEF DESCRIPTION OF THE DRAWINGS

The foregoing brief description and further objects, features, and advantages of the present disclosure will be understood more completely from the following detailed description of a personally preferred, but nonetheless illustrative, embodiment in accordance with the present disclosure, with reference being had to the accompanying drawings in which.

DETAILED DESCRIPTION OF THE PREFERRED EMBODIMENT

Figure 1:
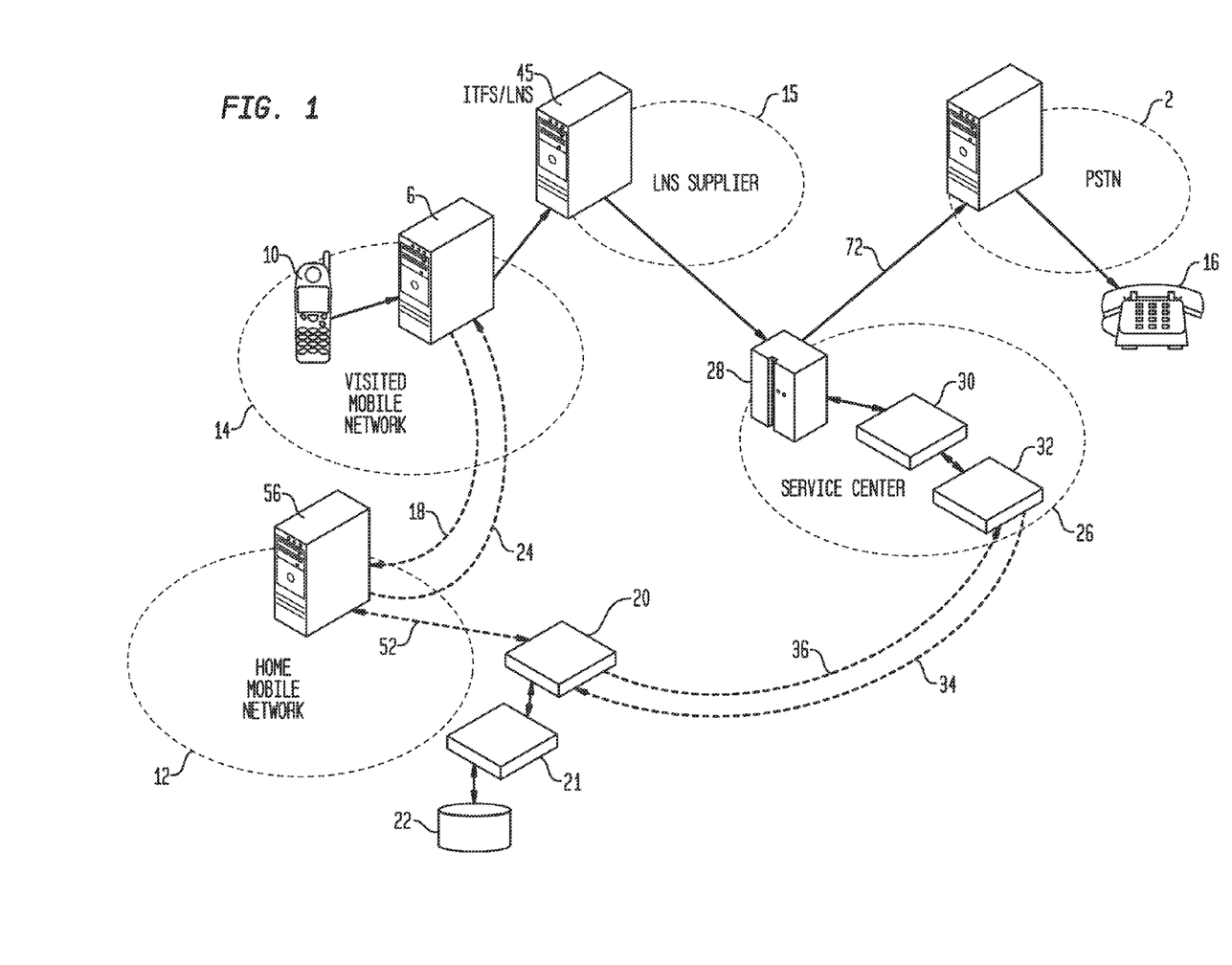
FIG. 1 is a block diagram illustrating an embodiment in accordance with the present disclosure operating in worldwide telephone systems.

Turning now to the drawings, FIG. 1 is a block diagram illustrating an embodiment in accordance with the present disclosure operating in worldwide telephone systems. A subscriber 10 from a home mobile network 12 may be roaming in a visited mobile network 14. For example, home network 12 may be in the United States and visited network 14 may be in Paris, France. Subscriber 10 may be attempting to place a long-distance call to a call recipient 16, who may, for example, be on a PSTN network PSTN 2 located in Russia. It should also be appreciated that either the subscriber 10 and/or the call recipient 16 may be on a Voice over Internet Protocol (VOIP) network. Hereafter, reference numeral 10 may be referred to as the subscriber or the wireless device interchangeably, but represents a subscriber with a wireless device as shown.

Additionally, the connections (e.g.; 18, 24) are preferably relatively high-speed communications channels, and may be IP connections, telephony connections, or any other type of connections. Moreover, computer system 6 need not be implemented in a single computer as shown, but may be a combination of numerous servers, gateways, and computers networked together in any suitable manner. Also, while a handheld device is shown representing subscriber 10, the techniques herein may be applicable to any type of device connecting to the visited network.

In one embodiment, visited network 14 may communicate with home network 12 via out-of-band signaling 18 (out-of-band signaling will be represented by broken lines herein), to request that home network 12 verify subscriber 10 and obtain permission to complete his call. Among the information communicated to home network 12 is the telephone number of subscriber 10 and the telephone number that subscriber 10 is calling. Other information about subscriber 10 that may be communicated may optionally include location, id number, calling privileges, SIM card identifying information, or any other information associated with, or stored in, the wireless device 10 or otherwise required by the applicable protocols being used.

In one embodiment, when network 12 receives the request from visited network 14, home network 12 communicates with a roaming server 21 and, through a process to be discussed in detail below, obtains a substitute telephone number from a number mapping database 22 through gateway 20. This substitute telephone number may be preferably a local telephone number (as opposed to a long distance telephone number) to network 14.

In different embodiments, roaming server 21, gateway 20, and number mapping database 22 can be a single device or separate devices. In one embodiment, roaming server 21 and number mapping database 22 are within home network 12 such that home network 12 can communicate with roaming server 21 and number mapping database 22 without gateway 20. It should be appreciated that home network 12 can communicate with roaming server 21 and number mapping database 22 in any suitable manner, through any suitable equipment.

In still another embodiment, the entire functionality of roaming server 21 may be incorporated into the Service Center 26. In such an embodiment, the gateway 32 may communicate directly with server 56. Moreover, the functionality of roaming server 21 may be implemented in any one or more processors, and at any one or more locations, and the particular breakdown of functionality among the numerous items shown is FIG. 1 is by way of example only.

Additionally, the number mapping database 22 may be remotely located from the home network 12 so that communications over line 52 and/or line 54 may be by way of dedicated data connections or the Internet. In one exemplary embodiment, the number mapping database 22 and/or gateway 20 may be shared by numerous different systems 56 which may be located in one or more home networks 12 located at various physical locations. Such an embodiment leaves open the possibility that economies of scale can be gained by sharing the roaming server 21 resource shown among numerous home networks or other equipment.

In one embodiment, home network 12 can respond to visited network 14 via out-of-band signaling 24 to verify subscriber 10 and grant permission to complete subscriber 10's call. Included in the response of network 12 may be an instruction to forward subscriber 10's call, originally made from the visited network 14 to a long distance number relative to that visited network 14, to the substitute telephone number which is local to the visited network 14. In response, network 14 routes subscriber 10's call to the local destination associated with the substitute telephone number.

Referring to FIG. 1, a long distance connection 72 is shown therein. Preferably, the operator of Service Center 26 has negotiated commercial arrangements with one or more long distance carriers such that calls are cost effectively routed over long distance link 72. In accordance with exemplary embodiments of the present disclosure, the functions of LNS supplier 15 and service center 26 are to offload the long distance from a first path to a second path. That is, without the technology described herein, long distance charges would be incurred to connect the call from the visited mobile network 14, to the PSTN 2 over a long distance path. Instead, those long distance charges are incurred to route the call from Service Center 26 to PSTN 2 as shown over path 72.

The functionality to perform such offloading is described herein with reference to Service Center 26 and LNS Supplier 15. However, such functionality could be in any combination of one or more processors, servers, or other components, and need not be implemented in the four components shown as 45, 28, 30, and 32 in FIG. 1. For example, the functions of LNS 45 could be incorporated into one or more servers without the Service Center 26.

Continuing with the Paris, France to Russia call example discussed above, network 14 may route subscriber 10's call to a local PSTN network in Paris, France to connect subscriber 10 with the destination associated with the substitute telephone number. It should be appreciated, as noted above, that network 14 can route subscriber 10's call through a VOIP network to reach the destination associated with the substitute telephone number.

In one embodiment, the substitute telephone number may be associated with a service center 26, a network which includes equipment to facilitate completing long-distance calls throughout the world, by arrangement with one or more other communication service providers. At service center 26, the substitute telephone number may be received at a switch 28, which may be preconfigured to forward call information to an application server 30. Via a gateway 32, application server 30 then communicates with roaming server 21 in home network 12. Preferably, this communication is via out-of-band signaling 34. During this communication, the substitute telephone number may be presented to gateway 20 and the actual long-distance number may be requested. In response, gateway 20 provides the actual long distance number to server 30, preferably via out-of-band signaling 36 between gateway 32 and roaming server 21. Once the actual long distance number is sent back to application server 30, the substitute number can be re-leased for reuse.

The service center shown in FIG. 1 includes at least three discrete components, server 30, gateway 32, and a switch 28. It is understood that such division of the various functionalities in different components is arbitrary and by way of example only. The various functions implemented by the center 26 may be implemented in any combination of one or more devices, and may also be distributed among those one or more devices in any convenient architecture. Also, the labels and functions for each such component are themselves exemplary. For example, switch 28 may actually be a gateway, session border controller, or any of a variety other devices. Application server 30 may be any type of processing device, potentially including a built in gateway and/or other switching system.

Returning to the exemplary embodiment of FIG. 1, the actual long-distance telephone number received at the gateway 32 from number mapping database 22 may be provided to application server 30 and then to switch 28 for routing (block 38), though any suitable connection such as via a point-to-point connection, via a network of service providers, or via the Internet, whereby the call may be completed to PSTN network PSTN 2 and, therethrough, to the call recipient 16. Note the recipient also may be a wireless device on a wireless network, although a landline telephone is shown for exemplary purposes.

The communications links 34 and 36 may serve to provide call status of the call, during its duration, to the roaming server 21 and related systems as shown. Such status information may be fed back using a variety of techniques. One such technique may be that specified call events and states can be communicated. For example, busy, no answer, caller hung up, etc. can be transmitted upon such statuses becoming activated.

Alternatively, periodic or continuous monitoring of, or status messages from, gateway 32 to roaming server 21 may be utilized. Preferably, roaming server 21 is in frequent enough communication with gateway 32 such that as soon as the call terminates, the substitute number being used for the call is quickly freed up to be used for a subsequent call and corresponding subsequent instantiation of the herein described methods. The substitute number can be released at any time after roaming server 21 communicates the originally dialed number to gateway 32. This ensures that when the system translates the substitute number back to the actual dialed number, there will always be a one to one mapping.

Figure 2:
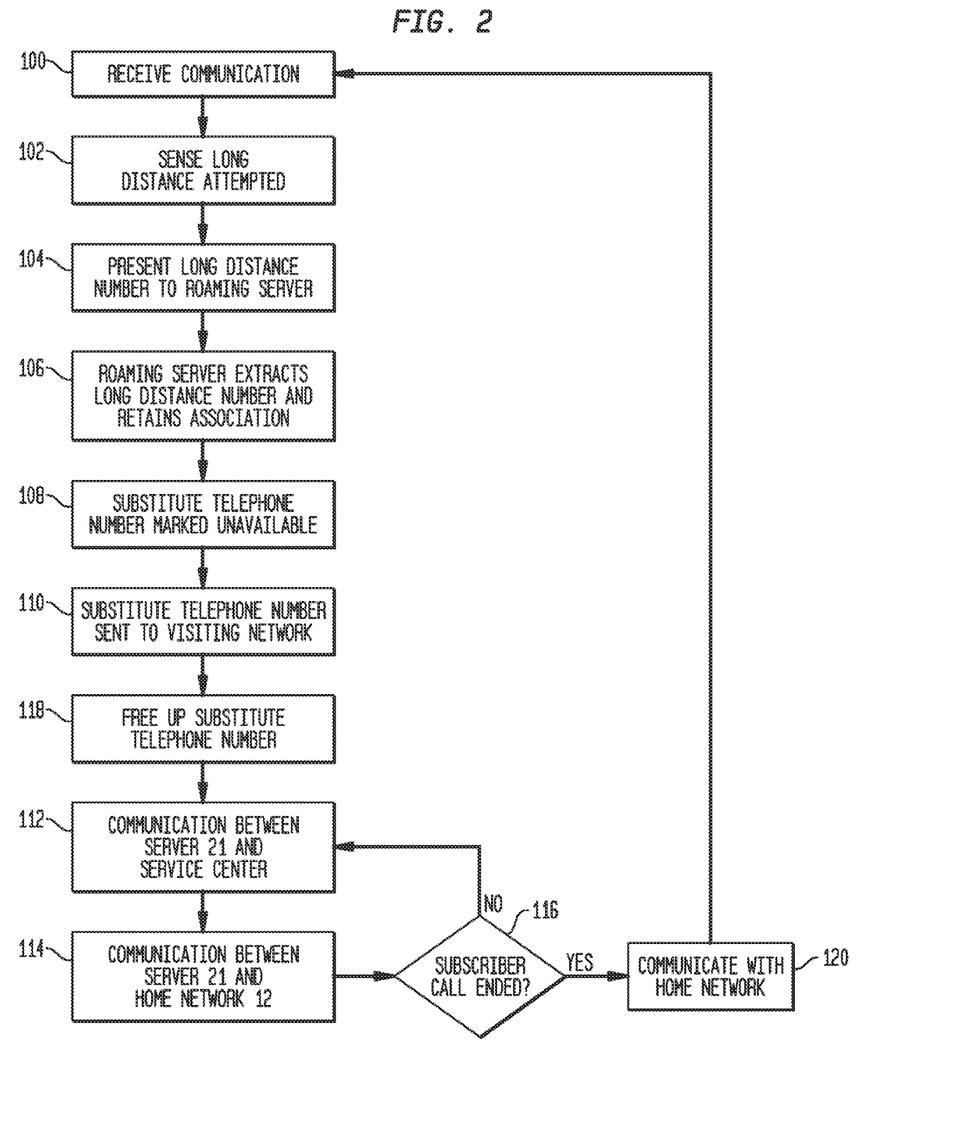
FIG. 2 is a flowchart illustrating operation at home mobile network 12.

FIG. 2 is a flowchart illustrating operation at home mobile network 12. At the outset, it should be appreciated that this operation is multithreaded. That is, multiple sessions of this process, running in a computer and network 12, may typically operate simultaneously. FIG. 2 illustrates just one of those sessions. Moreover, as discussed above, one or more home networks 12 may interface with, and utilize the resources of, roaming server 21. Thus, the methodologies described and indicated in FIG. 2 are not intended to imply that a single instantiation of such method is implemented on the specific items shown in FIG. 1, but instead, are shown as an example of certain actions that may be included in the method being executed.

The process starts at block 100, where home mobile network 12 receives communication 18 from visited mobile network 14. At block 102, network 12 senses that subscriber 10 is calling a long-distance number and contacts roaming server 21. During its initial communication, network 12 presents the long-distance number to gateway 20 (block 104). As explained above, gateway 20 maintains a database containing a pool of telephone numbers in association with their geographic location. From that pool, gateway 20 selects an available substitute telephone number which is local to visited network 14, and stores an association between the substitute telephone number and the long-distance number (block 106).

At block 108, the substitute telephone number is indicated in number mapping database 22 as unavailable, which may continue until number mapping database 22 communicates the real destination number to the Service Center 26 to free up local numbers from a pool of local numbers. Alternatively, the substitute number can remain unavailable for the duration of the call, but that is less preferable. It should be understood that the substitute telephone number is provided to the home network 12, which sends it to visited network 14, with an instruction to transfer the subscriber's call to that number (block 110). Once the substitute number is transmitted, it is freed up (block 118) for use in another call.

After being contacted by service center 26 via communication 34, roaming server 21 responds by a communication 36 of FIG. 1, and preferably, communication persists with service center 26, (block 112), with service center 26 reporting the status of the subscriber's call. Such communications may be in any one or more of the manners described previously herein.

Preferably, roaming server 21 should be informed when the call has ended. It is contemplated that roaming server 21 may maintain communication with home network 12 (block 114) keeping it informed of the status of the subscriber's call. Block 116 determines whether a subscriber's call has ended. If not, control returns to block 112. On the other hand, if the subscriber's call has ended, block 120, gateway 20 communicates that to home network 12, informing it that the subscriber's call has ended. For this session, control then transfers to block 100, to await initiation of new session of the process. This permits roaming server 21 to monitor activity on the previously described calls for purposes of billing, reconciliation, etc.

Figure 3:
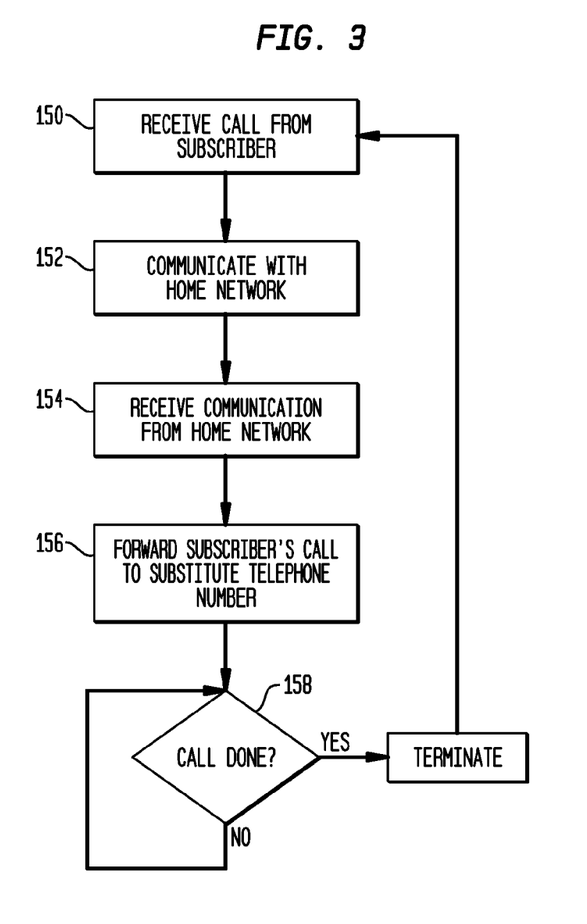
FIG. 3 is a flow chart illustrating operation at visited network 14.

FIG. 3 is a flowchart illustrating operation at visited network 14. As was the case with FIG. 2, this process is multithreaded, in that multiple sessions may run at the same time, only one of which is illustrated here. Those skilled in the art will appreciate that this process may be performed on one or more computers operated in the network.

Operation begins at block 150, where network 14 receives a call from subscriber 10, in which he is trying to reach a call recipient in Russia. At block 152, visited network 14 communicates with home network 12 (communication 18) to obtain permission to complete the call. In response, network 12 receives communication 24, in which it is instructed to forward the subscriber's call to the substitute telephone number, a local number (block 154). At block 156, network 14 transfers the subscriber's call to a local PSTN network, for connection to the substitute telephone number.

As the telephone call using the substitute number is still completed through switch 6, block 158 keeps that call completed until tear down as indicated. Control then reverts to block 150, where network 14 awaits receipt of a new telephone call.

Figure 4:
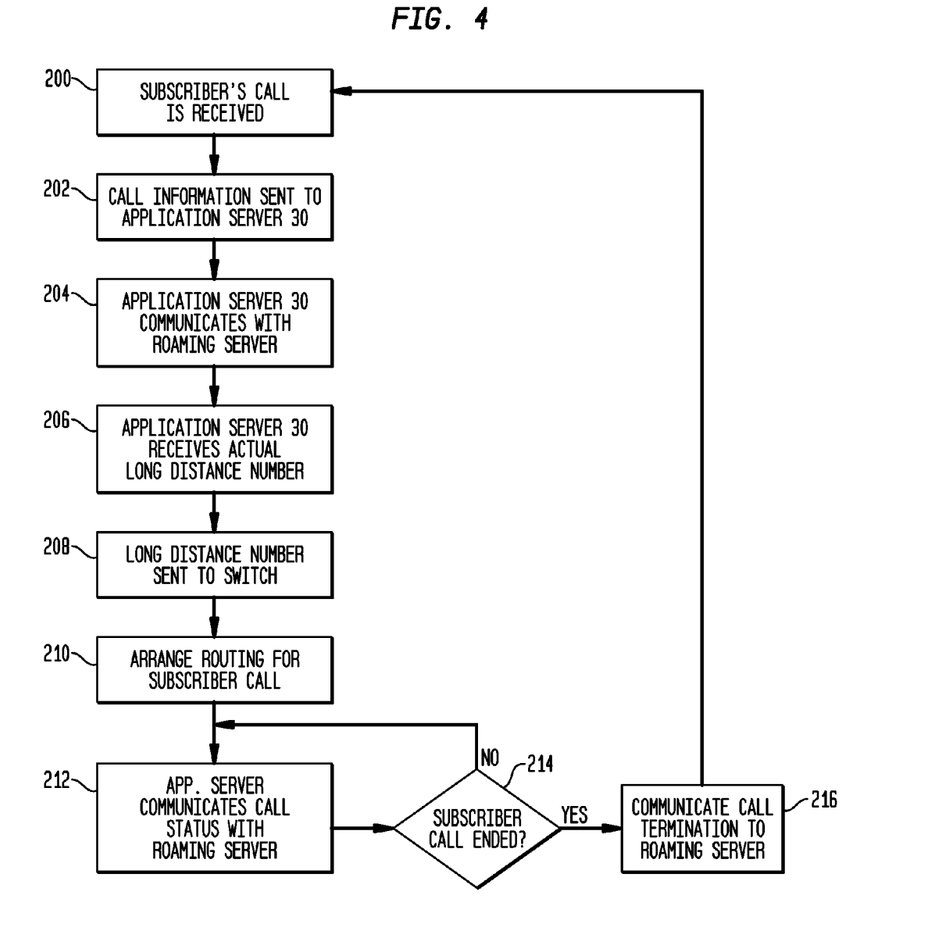
FIG. 4 is a flowchart illustrating operation at service center 26.

FIG. 4 is a flowchart illustrating operation at service center 26, which may occur in multiple, simultaneous sessions. The subscriber's call may be received at switch 28 (block 200), which may be pre-programmed to forward the call information to application server 30 (block 202) within Service Center 26.

At block 204, gateway 32 communicates with roaming server 21 (communication 34), requesting the long-distance number. As a practical matter, gateway 20 need only provide the substitute telephone number, as number mapping database 22 retains the long-distance distance telephone number in association with the substitute telephone number. At block 206 application server 30 receives the long-distance telephone number (via communication 36) and, at block 208, it provides that number to switch 28. Such number is used at block 210 to arrange for routing of the call.

For example, in one embodiment, service center 26 may query a route server (such as a least cost route server) to determine a call termination path that satisfies the home network's parameters for call quality and cost. Preferably, application server 30 continues to communicate with roaming server 21 (block 212), as long as the subscriber's call has not ended. Should the test at block 214 indicate that the subscriber's call has ended, application server 30 communicates to roaming server 21 that the subscriber's call has ended (block 216). Control then reverts to block 200, where receipt of another call is awaited.

Figure 5:
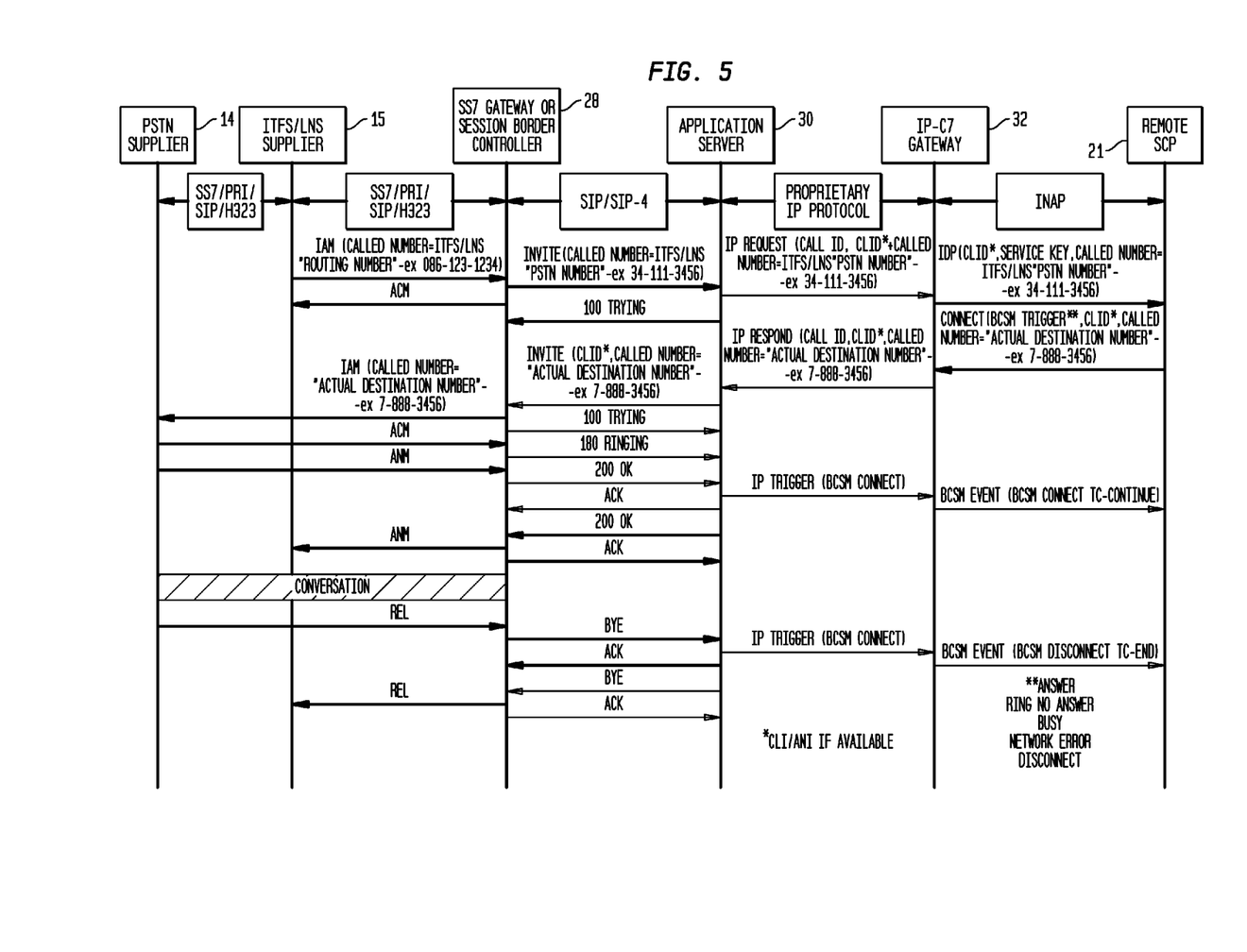
FIG. 5 is an information flow chart illustrating system operation as described in FIG. 4 in a normal mode of operation, in which a calling party calls a called party, the called party answers the telephone, they carry on a conversation, and then the calling party hangs up.
Figure 6:
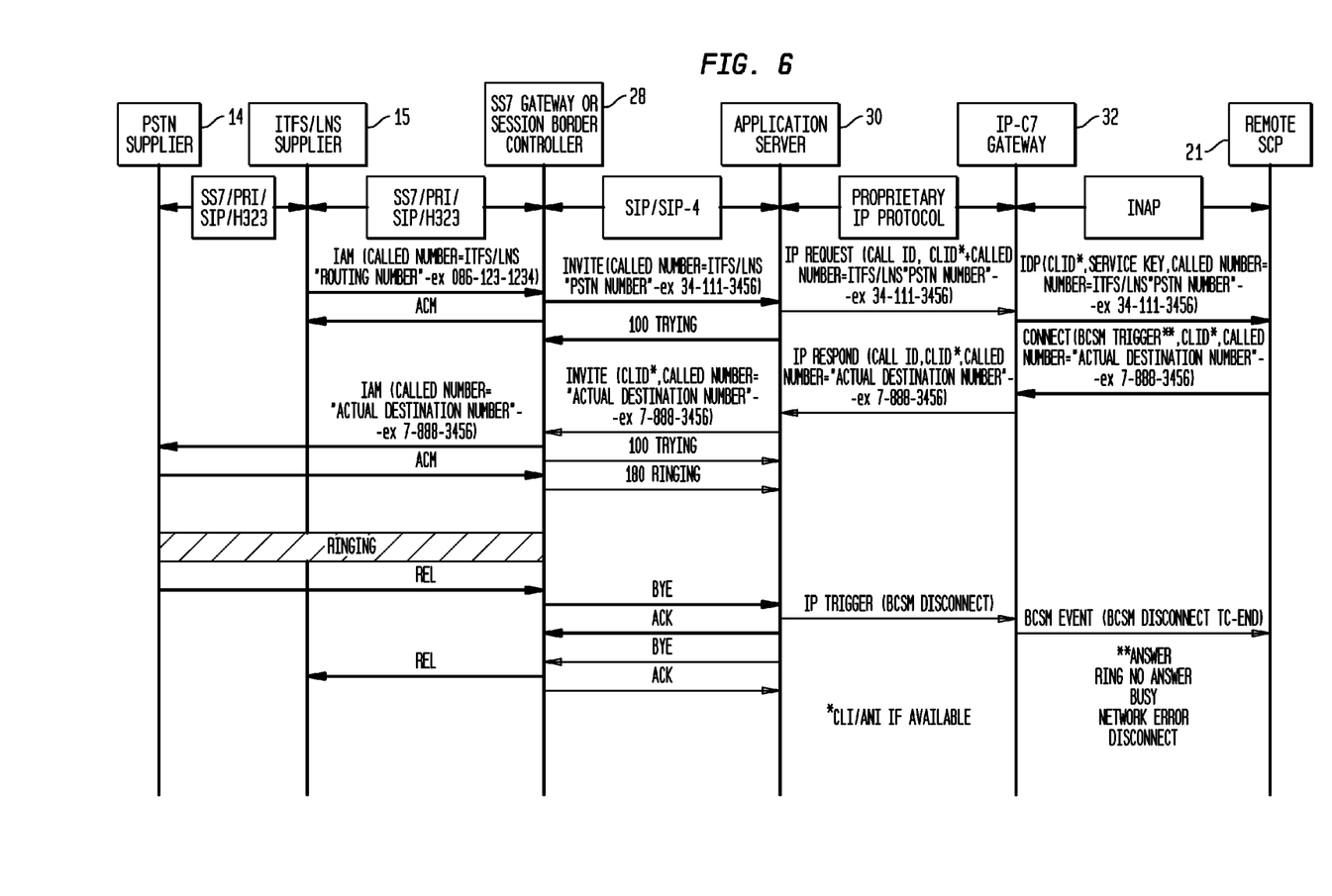
FIG. 6 is an information flow chart illustrating system operation as described in FIG. 4 in a special mode of operation in which a calling party calls a called party and then decides to hang up while the called party's telephone is ringing.

FIGS. 5 and 6 are signal flow charts helpful in further understanding system operation as described by FIG. 4. FIG. 5 illustrates normal operation, where subscriber 10 calls call recipient 16, recipient 16 answers his telephone, they carry on a conversation, and then the call terminates when they hang up. FIG. 6 illustrates a special mode of operation in which subscriber 10 calls call recipient 16 and then decides to hang up while the call recipient's telephone is ringing.

The acronyms appearing in FIGS. 5 and 6 have the following meaning:
ACK: Acknowledge
ACM: Address Complete Message
ANI: Automatic Number Identification
ANM: Answer Message
BCSM: Basic Call State Model
C7: Also known as CCIS 7 (Common Channel Interoffice Signaling 7)
CLID: Calling Line Identification
IAM: Initial Address Message
INAP: Intelligent Network Application Part
IP: Internet Protocol
ITFS: International Toll Free Service
LNS: Local Number Service
PRI: Primary Rate Interface
PSTN: Public Switched Telephone Network
REL: Release Message
SCP: Service Control Point
SIP: Session Initiation Protocol
SS7: Signaling System No 7

To facilitate an understanding of the signaling, and referring collectively to FIGS. 1, 5, and 6, the vertical lines in FIGS. 5 and 6 represent the exemplary components from the earlier Figures previously described, and have been numbered correspondingly. As can be seen along the top line of signal flow (from left to right) the call enters service center 26, information flow is from switch 28 to application server 30, and then to Gateway 32. Information flows to roaming server 21 (transmission 34). SCP functionality is implemented at roaming server 21. Immediately below, information returns from roaming server 21 (transmission 36) and then flows to Gateway 32, application server 30, Switch 28, and out to the telephone system.

ITFS/LNS supplier 45 switch receives a call from a roaming cellular subscriber (either directly from the roaming cellular subscriber or indirectly through one or more other gateways/switches). The call includes the called number and may include the caller ID or other information.

In one embodiment, the ITFS/LNS supplier switch 45 examines the called number and creates a unique routing number for the called number. The unique routing number includes a service type identifier and a routing phone number that is uniquely associated with the called number. The called number may be a number that is associated with a particular voice service. For example, the called number may be associated with one of a plurality of different voice services, such as, but not limited to, toll offload service, international toll free service, or voice termination service. Each one of the plurality of different services may be associated with a unique service identifier. Depending on the particular type of service that is associated with the called number, the ITFS/LNS supplier switch 45 may use the generated routing number in place of the called number when communicating with another device about a call.

In one embodiment, the ITFS/LNS supplier switch generates a message that includes the routing number associated with the type of service and the called number after receiving the call from the roaming cellular subscriber. The ITFS/LNS supplier switch 45 also selects a communications path (or trunk group) associated with the routing number and transmits the message to a switch 28 as shown.

In one embodiment, the message is an SS7 based Initial Address Message (IAM) that includes the routing number (and the CLID, if available) sent to an SS7 Gateway or Session Border Controller. However, it should be appreciated that the message may be formed as an SS7, PRI, SIP, H.323, or any other suitable call signalling protocol depending on the capabilities of the ITFS/LNS supplier switch and the connected Gateway.

In one embodiment, when the switch 28 receives the message from the ITFS/LNS supplier switch 45, it determines whether it can complete the call or whether it requires additional information from another device to complete the call. To make the determination, the switch 28 may examine the routing number and determines the service type that is associated with the service type identifier in the routing number. For example, if the switch 28 determines that the service type is toll offload, it must seek additional information from an Application Server 30. associated with toll offload. The switch 28 also examines the routing number in the transmitted message to determine the called number that is associated with the routing phone number. The switch 28 thereafter generates a message that includes the called number (and the CLID, if available).

In one embodiment, the generated message can be a Session Initiation Protocol (SIP) Invite message that includes the called number (and the CLID, if available). The switch 28 also selects one of a plurality of communications paths (or trunk groups) by which to transmit the Invite message based on a communication path that is associated with the service type. For example, if the service type identified from the routing number is for toll offload service, the switch 28 selects the communication path associated with toll offload. It should be appreciated that the Invite message may be formed in any suitable message format depending on the protocols that are utilized by the switch 28 to communicate with other devices. The switch 28 transmits the Invite message to an Application Server 30 connected to the selected communication path.

In one embodiment, when the Application Server 30 receives the message from the switch 28, the Application Server 30 examines the message contents and may determine, among other elements, the called number and the CLID (if available). The Application Server 30 generates a Request message that may include, the called number, the calling line identification (CLID) (when the CLID/Automatic Number Identification (ANI) is available), and a service ID (an identifier that indicates that the message is associated with a toll offload service). In one embodiment, the Request message generated by the Application Server 30 may be an Internet Protocol (IP) based message, but it should be appreciated that the Request message can utilize any suitable message format. The Application Server 30 transmits the Request message to Gateway 32.

In one embodiment, when the Gateway 32 receives the message from the Application Server 30, the Gateway 32 examines the Request message and may determine the called number, the CLID (when available), and the service ID. In one embodiment, the Gateway 32 may be an IP/C7 Gateway Switch that can translate messages between different formats. In this embodiment, the IP/C7 Gateway Switch translates IP based messages into SS7 based messages to permit IP based networks to communication with SS7 based networks. Based on the contents of the Request message, the IP/C7 Gateway 32 generates an Initial Detection Point (IDP) message, which may include the called number, the CLID, a Service Key. In one embodiment, the IDP message may be an SS7 Intelligent Network Application Part (INAP) message destined for an SS7 based Service Control Point (SCP) switch. The Gateway 32 transmits the IDP message to the SCP in order to obtain the real destination number that roaming cellular subscriber intended to call. It should be appreciated that any suitable device may be used to store the real destination number that the roaming cellular subscriber intended to call and the IDP message can be in any suitable format to suit communication with the device that stores the real destination number.

In one embodiment, when roaming server 21 receives the IDP message from the Gateway 32, roaming server 21 examines the message and and may determine the called number, the CLID, and the service key. Roaming server 21 performs a look up operation in a database to determine the real destination number that the roaming cellular subscriber intended to call. Roaming server 21 also generates an SS7 INAP Connect message that includes, among other elements, the real destination number as the called number, the CLID, and one or more event triggering. The event triggers define certain events associated with a phone call. When the certain events occur at a device handling a call, the device handling the call may provide a notification to roaming server 21 of the occurrence of the event. The triggers may include events such as, but not limited to: (i) when a call is answered, (ii) when a call rings, but does not obtain an answer, (iii) when a call receives a busy signal, (iv) when a call obtains a network error, and/or (v) when a call obtains a disconnect message. In one embodiment, the event triggers can be a Basic Call State Model (BCSM) Triggers. Roaming server 21 transmits the INAP Connect message to the IP/C7 Gateway.

It is noted that the triggers are optional, and other forms of communication such as continuous or semi-continuous may be used. The embodiments described herein are not to limit the manner in which said communications take place.

When the IP/C7 Gateway 32 receives the INAP Connect message, the IP/C7 Gateway 32 examines the INAP Connect message and may determine the called number, the CLID, and any BCSM Triggers. The IP/C7 Gateway generates a Respond message based on the received INAP Connect message. The Respond message may include, among other elements, the called number, the CLID, and the BCSM Triggers. The IP/C7 Gateway 32 transmits the Respond message to the Application Server 30.

When the Application Server 30 receives the Respond message, the Application Server 30 examines the Respond message and may determine the called number, the CLID, and any BCSM Triggers. In one embodiment, the Application Server 30 handles the call processing to connect the roaming cellular subscriber to the intended real destination number. In one such embodiment, the Application Server 30 determines what BCSM Triggers were requested for the call. When the triggering events associated with each received BCSM Trigger occurs during the call to the real destination number, the Application Server may send a communication destined for roaming server 21, indicating that the triggering event occurred. The Application Server 32 also directs the switch 28 to initiate a new call to the real destination number. In one embodiment, to initiate the new call, the Application Server 30 generates an Invite message that may include the called number (i.e., the real destination number), and the CLID and transmits the Invite message to the switch 28.

When the switch 28 receives the Invite message from the Application Server 30, the switch 28 examines the Invite message and may determine the called number and the CLID. Based on the Invite message, the switch 28 also attempts to initiate a new call to a destination switch associated with the called number. In one embodiment, when the switch 28 is an SS7 Gateway or Session Border Controller, the switch 28 generates an IAM message and routes the call to a destination switch associated with the destination number using any suitable route selection system, such as, but not limited to a least cost routing system.

In one embodiment, while the switch 28 is attempting to complete the call to the called number, switch 28 receives typical call setup, tear down, and other call processing messages from a destination switch. The switch 28 may generate typical status messages based on the received call processing message from the destination switch and transmit these status messages to the Application Server 30 (e.g., when the Application Server 30 is handling the call processing).

In one embodiment, when the Application Server 30 is handling call processing and the Application Server 30 receives an indication from the switch 28 that the call has been connected with the destination number, the Application Server 30 may bridge the call from the roaming cellular subscriber with the call to the destination number and permit the roaming cellular subscriber to communicate with the callee at the destination number.

In one such embodiment, when the Application Server 30 is handling call processing, the entire call between the roaming cellular subscriber and the callee at the destination number may be routed through the Application Server 30. The Application Server 30 may also constantly monitor messages from the switch 28 based on the BCSM Triggers. If an event associated with a received BCSM Trigger is detected at the Application Server 30, it may transmit a message to roaming server 21 via the IP-C7 Gateway 32 informing roaming server 21 of the detected event. In this manner, roaming server 21 can be kept abreast of the status of the call between the roaming cellular subscriber and the called party at the destination number despite being outside of the call flow.

As an example, in one such embodiment, the Application Server 32 receives a 200 OK message from the switch 28. If the Application Server 30 received a BCSM Trigger regarding when a call is answered, the Application Server 30 may generate a message including a BCSM Connect and transmit the BCSM Connect to roaming server 21 (as shown in FIG. 5). Similarly, if the Application Server 30 received a BCSM Trigger regarding when a call is disconnected, the Application Server 30 may generate a message including a BCSM Disconnect and transmit the BCSM Disconnect to roaming server 21 (as shown in FIG. 5). In this manner, roaming server 21 can record the status of the call, even though roaming server 21 is not part of the call processing.

FIG. 6 shows a slightly modified version of the signal diagrams of FIG. 5. Although the upper portion of FIG. 6 is similar to that of FIG. 5, FIG. 6 shows an exemplary message flow when the called number is not answered. Portions below the "ringing" shown on the left of FIG. 6 indicate that after a number of rings, the caller hangs up so a release message REL is sent to switch 28. The shown BCSM Disconnect message then flows through the application server 30 and gateway 32 to roaming server 21 as shown, thereby causing the release of the substitute number and call tear down, in a fashion similar to that described above for when an answered call terminated.

Although preferred embodiments have been disclosed for illustrative purposes, those skilled in the art will appreciate that many other additions, modifications, and substitutions are possible without departing from the scope and spirit of the invention as defined by the accompanying claims.

What is claimed is:

1. A method comprising:
   receiving, by a roaming server from a server in a home network, information relating to a call that has been placed to a called number by a roaming user of the home network;
   transmitting, by the roaming server to the server in the home network, a substitute number for the called number, in response to the receiving of the information, wherein the substitute number is associated with a service center;
   maintaining, by the roaming server, a record of an association between the substitute number and the called number;
   receiving, by the roaming server via out-of-band signaling, from the service center and after the transmitting of the substitute number, information that is sufficient to identify the substitute number; and
   transmitting, by the roaming server to the service center, the called number i) in response to the receiving of the information that is sufficient to identify the substitute number and ii) based on the association between the substitute number and the called number.

2. The method of claim 1 wherein the called number is a long distance number and the substitute number is a local number for the roaming user.

3. The method of claim 2 further comprising:
   maintaining, by the roaming server, a pool of available numbers to be used as substitute numbers for calls, and, in conjunction with the transmitting of the substitute number, removing, by the roaming server, the substitute number from the pool for a duration associated with the call.

4. The method of claim 3 further comprising receiving, by the roaming server, messages relating to call status during the duration associated with the call.

5. The method of claim 3 wherein the transmitting of the called number comprises transmitting to a second network.

6. A method comprising:
receiving, by a roaming server from a server in a home network, a series of numbers, each number representing a separate long distance call;
converting, by the roaming server, each of the numbers to a separate substitute number for placing a local call;
transmitting, by the roaming server, the substitute numbers to the server in the home network while maintaining an association between i) each number representing a long distance call and ii) each substitute number, wherein the substitute numbers are associated with a service center;
receiving, by the roaming server from the service center, the substitute numbers via out-of-band signaling; and
reconverting, by the roaming server, each substitute number received from the service center back into a number whose association with the substitute number has been maintained.

7. The method of claim 6 wherein the converting comprises performing a database lookup and obtaining the substitute number from the database lookup.

8. The method of claim 7 comprising removing the substitute number from a pool of the substitute numbers with the step of transmitting, and replacing the substitute number into the pool upon termination of a long distance call associated with the substitute number.

9. The method of claim 7 further comprising reusing at least one of the substitute numbers for future, different long distance calls.

10. The method of claim 9 further comprising using out of band signaling at times during the duration of the call to receive signaling messages indicative of call status, and for conveying a call termination condition.

11. A method comprising the steps of, at a switching system having a local telephone connection in a visited network:
receiving a call from a wireless device of a mobile user from a home network who is roaming in the visited network, the user attempting to call a call recipient remote to the visited network by using a telephone number of the call recipient;
communicating via out-of-band signaling with the home network to obtain a substitute telephone number that is to be used instead of the telephone number of the call recipient; and
controlling completion of a call connection of the call of the mobile user to the obtained substitute telephone number.

12. The method of claim 11 wherein the call recipient is also remote to the home network.

13. The method of claim 11 wherein the switching system contains a switch preconfigured to forward the call from the mobile user to a server using the number of the local telephone connection, the server controlling the communicating step.

14. The method of claim 11 further comprising, in the home network:
receiving an out of band communication from the visited network requesting permission to complete a connection for the call from the mobile user;
initiating extraction of the substitute telephone number from a database, which substitute telephone number is local to the visited network; and
sending an out of band response to the visited network instructing it to connect the call of the mobile user to the extracted substitute telephone number.

15. The method of claim 14 wherein extraction is performed in the home network and the database is accessible to the home network.

16. The method of claim 15 wherein the database is located in the home network.

17. The method of claim 14, further comprising causing the extracted substitute telephone number to be marked in the database as used, and causing it to be removed from a pool of available numbers in the database.

18. The method of claim 17, further comprising associating the extracted substitute telephone number with the telephone number of the call recipient.

19. The method of claim 18, further comprising, in response to the communicating step, sending the substitute telephone number to the switching system.

20. The method of claim 14, further comprising associating the extracted substitute telephone number with the telephone number of the call recipient.

21. The method of claim 20, further comprising, in response to the communicating step, sending the substitute telephone number to the switching system.

22. A method comprising the steps of, in a home network:
receiving, by a server in the home network, a communication via out-of-band signaling from a visited network requesting permission to complete a call from a mobile user from the home network who is roaming in the visited network, the user attempting to call a call recipient remote to the visited network;
initiating, by the server in the home network, extraction of a telephone number from a database that is accessible through a second server, the second server being physically distinct from the server in the home network, wherein the telephone number is local to the visited network; and
sending, by the server in the home network, a response via out-of-band signaling to the visited network instructing it to connect the call from the mobile user to the extracted telephone number.

23. The method of claim 22 wherein the call recipient is remote to the home network.

24. The method of claim 22 wherein extraction is performed in the home network and the database is accessible to the home network.

25. The method of claim 24 wherein the database is located in the home network.

26. The method of claim 22, further comprising causing the extracted number to be marked in the database as used, and causing it to be removed from a pool of available numbers in the database.

27. The method of claim 26, further comprising associating the extracted number with the call recipient's telephone number.

28. The method of claim 27, further comprising sending the recipient's telephone number to a switching system.

29. The method of claim 22, further comprising associating the extracted number with the call recipient's telephone number.

30. The method of claim 29, further comprising sending the recipient's telephone number to a switching system.

31. The method of claim 22 further comprising, in the visited network: sending an out of band communication to the home network requesting permission to complete a connection for the call from the mobile user;
   receiving an out of band communication from the home network instructing transfer of the call from the mobile user to a local number which the home network associates with the call recipient's number; and
controlling completion of a call connection to the local number.

\* \* \* \* \*